United States Patent Office 3,758,449
Patented Sept. 11, 1973

3,758,449
DRILLING FLUID STABILIZER
Lutz Hoppe, Walsrode, and Dieter Dobbertin, Fallingbostel, Germany, assignors to Wolff Walsrode Aktiengesellschaft, Walsrode, Germany
No Drawing. Filed June 29, 1971, Ser. No. 158,065
Claims priority, application Germany, June 29, 1970,
P 20 31 972.6
Int. Cl. C08f 3/76, 15/38, 27/14
U.S. Cl. 260—85.5 R
7 Claims

ABSTRACT OF THE DISCLOSURE

A drilling fluid stabilizer comprising a hydrolysis product of polyacryonitrile with an amount of hydrolysed and nonhydrolysed nitrile groups, the hydrolysed nitrile groups consisting of carboxylic acid amide groups and ammonium carboxylate groups.

PRIOR ART

Hydrolysis products of polyacrylonitrile are already known from U.S. Pat. No. 2,718,497. There polyacrylonitrile is hydrolysed by sodium hydroxide at a temperature of from 40 to 50° C. in such a way that from 60 to 95% of the nitrile groups are converted to —COONa or —COONH$_4$ groups.

Since the solids content is a measure of the degree of hydrolysis of the polyacrylonitrile and (a) the starting point is a solids content of 15% by weight of pure polyacrylonitrile in aqueous solution, and
(b) on addition of 1 mol water per molecular unit of the polyacrylonitrile a 20.1% by weight aqueous solution, and
(c) on addition of 2 mol water per molecular unit of the polyacrylonitrile a 25.2% by weight solution is obtained, the above mentioned alkaline conversion described in U.S. Pat. No. 2,718,497 of from 60 to 95% by weight of the nitrile groups to —COONa groups or to —COONH$_4$+ groups would mean that—in the case of the stated minimum conversion of 60% by weight a 21.1% by weight but in the case of the stated maximum conversion of 95% by weight, a 24.9% by weight polyacrylonitrile hydrolysate solution was obtained.

Now, with so high a degree of hydrolysis of the polyacrylonitrile there is also a large number of —COONH$_4$+ groups present which in their turn react with alkaline earth ions of the surrounding rocks in the bore hole and can thus cause precipitation and destruction of the drilling fluid, especially at the high temperatures and pressures obtaining in deep bore holes.

This thermal instability, not mentioned in U.S. Pat. No. 2,718,497 but, at least by the applicant, discovered by repeating the tests, presumably contributed some years later to hydrolysis of acrylonitrile by steam being preferred to that by alkali.

An introduction to the so-called steam process would, on the face of it, have been obtainable from the published German patent application B 35,382 IVb/39c of Sept. 20, 1956 had it not (according to German patent specification No. 1,207,086, column 3, lines 6–11) been shown that the steam treatment of polyacrylonitrile mentioned in the published application B 35,382 gives no polyacrylonitrile hydrolysates.

On the other hand, a genuine technical advance is to be seen in German patent specification No. 1,207,086 because here for the first time a process for the preparation of modification products of polyacrylonitrile is recorded in which viscous water soluble polyacrylonitrile hydrolysates are produced in an aqueous slurry under pressure at temperatures between 180 and 220° C. with a reaction time of 4–8 hours. As can be seen from a comparable representation of the infra-red spectra reproduced below, the polyacrylonitrile hydrolysate produced in accordance with German patent specification No. 1,207,086 contains no nitrile groups and the ratio of the —NH$_2$ groups formed by hydrolysis from the nitrile groups by taking up 1 mol of water to the NH$_4$+ groups formed by taking up 2 mol of water is 1:1. This high proportion of —NH$_4$+ groups results presumably above all during severe thermal treatment of the product, in a sensitivity to calcium and magnesium ions, owing to which the use of such products as protective colloids in deep-bore drilling fluids in accordance with first published German specification (Offenlegungsschrift) 1,483,798 has not been a success. For the same reasons similar products described in the literature (Journal of Polymer Science, A 1, 5 (1967), No. 1, pages 161–169) are thermally unstable. In both cases, presumably as a result of the complete hydrolysis of the acrylonitrile, the lack of residual nitrile groups has an unfavourable effect since it is perhaps owing to this that the buffering effect of the nitrile groups, which depends on the incorporation of further water, does not exist and the —NH$_2$ groups are, therefore, hydrolysed further to —NH$_4$+ groups, as a result of which the thermal sensitivity to CA$^{++}$- and Mg$^{++}$-ions is increased still more. Since according to the last mentioned publication such polyacrylonitrile hydrolysates can only be obtained by gamma-radiation of acrylonitrile using a Co$^{60}$ source under pressures of 5130–34200 atm. at temperatures of 85–200° C., the process has scarcely been used on an industrial scale owing to this method of preparation which is expensive and not without danger.

As other methods also, such as the alkaline hydrolysis of copolymers of acrylonitrile and high ethylvinylethers, described in Japanese patent specification No. 13,750/68, did not give products which could be successfully used in high temperature resistant, deep-bore drilling fluids, because among other things too large chain molecules are no longer water soluble and in addition the ether groups cannot stabilize the drilling fluid, it has already been proposed in an earlier application by the present applicant (unpublished German patent application P 19 45 371.5, filed Sept. 6, 1969) to simplify the matter by using polyacrylonitrile in the form of a powder, granules or spinning waste together with other conventional drilling fluid stabilizers as components of a high-temperature resistant drilling fluid because, at the high temperatures and pressures ruling in deep bore holes, the polyacrylonitrile contained in the aqueous drilling fluid is converted to the desired polyacrylonitrile hydrolysate.

Although according to the above cited German patent application P 19 45 371.5 the preparation of the polyacrylonitrile hydrolysate can be left to nature and thus the expensive preparation of a finished polyacrylonitrile hydrolysate avoided, whereby a considerable technical advance could be achieved, it was found from a series of field tests that this was at the expense of an uncertainty regarding the qualitative and quantitative course of the hydrolysis, so that, in case of incomplete reaction of the nitrile groups, which could not be excluded, the known disadvantages of an undesirable high proportion of ammonium carboxylate groups occurred. Since under the high temperature and pressure conditions obtaining in deep bore holes these react preferentially with alkaline earth ions, the protective colloid is precipitated out so that the water-based drilling fluid becomes ineffective.

OBJECT OF THE INVENTION

In reference to the state of the art as presented above with its inherent defects it is therefore an object of the invention to provide a drilling fluid stabilizer in the form of a water-soluble hydrolysis product of polyacrylonitrile which no longer had the disadvantages mentioned and which could also withstand for long periods of time the extremely severe temperature conditions to which it is exposed when used as the said protective colloid in deep-bore drilling fluids.

THE INVENTION

According to the invention, this object is achieved by a drilling fluid stabilizer comprising a water-soluble hydrolysis product of polyacrylonitrile, containing besides 1–25 mol percent nonhydrolysed nitrile groups, 75–99 mol percent hydrolysed nitrile groups of which more than half are water-soluble carboxylic acid amide groups and the rest water-soluble ammonium carboxylate groups.

Such a product ensures, as shown below in the examples, an excellent thermal stability and can therefore be employed with great success as a protective colloid in water-based deep-bore drilling fluids, even under extreme temperature and pressure conditions.

Since according to the present state of the art (German patent specification No. 1,207,086, column 2, lines 15–18) it was still regarded as essential that the hydrolysis of the polyacrylonitrile should be carried through until all the nitrile groups have been converted, in order to be able to use such products successfully according to first published German patent specification (Offenlegungsschrift) 1,483,798 as protective colloids in drilling fluids, it is surprising that with the product of the present invention, the nitrile groups of which have been only incompletely reacted, still better results could be obtained.

Until now it has only been possible to explain this unexpected effect by assuming that the nitrile groups which have not been converted prevent the conversion of carboxylic acid amide groups to ammonium carboxylate groups which commences again under the extreme temperature and pressure conditions in the bore hole, in that instead of water being incorporated at the carboxylic acid amide groups it is incorporated at the unconverted nitrile groups. The exchange reaction mentioned in the above discussion of the state of the art and occurring preferentially under extreme temperature and pressure conditions, between the ammonium carboxylate groups and the alkaline earth ions originating in, for example, the rocks surrounding the bore hole, cannot exert any noticeable deleterious effect because, as a result of the above described buffering action of the nonhydrolysed nitrile groups, the proportion of the ammonium carboxylate groups in the product of the invention remains small over long periods of time even under extreme conditions of temperature and pressure.

The best results were obtained with the aforesaid drilling fluid stabilizer in the form of water-soluble hydrolysis product of polyacrylonitrile, which contains besides of 5–15 mol percent nonhydrolysed nitrile groups 85–95 mol percent hydrolysed nitrile groups, of which are 51–90 mol percent carboxylic acid amide groups and 10–49 mol percent ammonium carboxylate groups.

Therefore the water-soluble hydrolysis product of polyacrylonitrile contains besides 1–25 mol percent nonhydrolysed nitrile groups 75–99 mol percent hydrolysed nitrile groups, of which more than half are water-soluble carboxylic acid amide groups and the rest water-soluble ammonium carboxylate groups. In a particular advantageous embodiment of the invention the aforesaid water-soluble hydrolysis product of polyacrylonitrile contains besides 5–15 mol percent nonhydrolysed nitrile groups 85–95 mol percent hydrolysed nitrile groups, of which 51–90 mol percent are water-soluble carboxylic acid amide groups and 5–35 mol percent water-soluble ammonium carboxylate groups.

Although the product of the invention can be obtained independently of any particular process, and hence the invention is not subject to any process limitation, a suitable method of preparation for the product of the invention will be given:

In the process of preparing a drilling fluid stabilizer, the method of preparation of a water-soluble hydrolysis product of polyacrylonitrile comprises mixing a fine divided polyacrylonitrile-substance, polymerised from 95% by weight acrylonitrile and 5% by weight methyl acrylate, with water, stirring the mixture and keep them while stirring at a temperature between 180–200° C. for 3–8 hours and cooling the formed clear viscous aqueous solution of polyacrylonitrile hydrolysate with a solids content of 18.9 to 22.9% by weight to room temperature.

The hydrolysates of the invention can, for example, be obtained either by heating an aqueous slurry of polyacrylonitrile powder or cut "Dralon"® fibres possibly with pigments added to the water in an autoclave equipped with a stirrer at 180–220° C. in order to effect the hydrolysis. A reaction temperature of 185° C. is best because at higher temperatures the proportion of the ammonium carboxylate groups compared with that of the carboxylic acid amide groups becomes too high and then, as discussed above, the hydrolysate can form water-insoluble salts with $Ca^{++}$-ions and/or $Mg^{++}$-ions and thus partly lose its effectiveness as a heat resistant protective colloid. Owing to the fact that on the one hand the reaction time at 220° C. is 0.5 hr., at 200° C. already 3 hrs., at 190° C. about 6 hrs. and at 180° C. as much as 11–12 hrs., while on the other hand the preparation of the products of the invention requires low reaction temperatures, an optimum relation between duration and the temperature of the reaction must be sought. For example, this can be achieved by the addition of initiators, since by this means the reaction time under mild temperature conditions can be considerably shortened. Very favourable results are obtained in this process, if the said hydrolysis of polyacrylonitrile is carried out in the presence of peroxide initiators, which may be selected from the group of tertiary butyl hydroperoxide, available commercially under the trade name Trigonox b®, 1,3-bis(tert-butylperoxyisopropyl) benzene, available commercially under the trade name Perkadox® 14, tert-butylamylperoxide, available commercially under the trade name Trigonox® T, or a mixture thereof.

The method of preparation and properties of the water-soluble hydrolysis products of polyacrylonitrile according to the invention and properties of the deep-bore drilling fluids containing the said hydrolysis products are recorded in the following Examples 1–10 and the summarizing Tables I, II and III, which refer to the said 10 examples.

Example 1

370 g. of a powdered polyacrylonitrile substance having a K-value of 85, which is polymerised from 95% by weight acrylonitrile and 5% by weight methacrylate, was mixed with 2100 ml. water in an autoclave. Then the mixture was stirred for 3 hours and the polyacrylonitrile was partially hydrolysed while maintaining the temperature at 200° C. After conclusion of the partial hydrolysis the end product exists in the form of a clear viscous aqueous solution with a solids content of 20.9% by weight and a relative viscosity of 1.82.

Examples 2–10

In the Examples 2–10, the process for the production of hydrolysed polyacrylonitrile is handled on principle in the same manner as in Example 1. Special variations within the said Examples 2–10 will be illustrated by the following explanations (items (1)–(7)), by the tabular representation and by the discussion of the evaluation of the tabular data appended to Tables I, II and III.

(1) Of the 10 examples, numbers 1–8 refer to products of the invention and to their use ("according to the invention"=I, see Table 1, column 2), while the remaining examples are concerned with commercially available products ("comparison"=C, see Table 1, column 2).

(2) As starting material (see Table 1), columns 3 and 4 for Examples 1, 2, 3, 5, 7, 8, 9 and 10 a powdered polyacrylonitrile of Farbenfabriken Bayer was used which is polymerised from 95% by weight acrylonitrile and 5% by weight methacrylate. In the case of the remaining examples 4 and 6 a polyacrylonitrile fibre (Dralon®) was used, which is pigmented with titanium dioxide and which in reference to a former solvation process of the said polyacrylonitrile fibre contains as a rest of this solvent 5-10% by weight dimethylformamide.

(3) These starting substances were hydrolysed for a certain time (=hr.) at a certain temperature (=T, ° C.) as shown in Table 1, columns 5, 6 and 7. In each case 370 g. polyacrylonitrile substance having a K-value of 85 were mixed with 2100 ml. water and stirred under the test conditions given in the table. The K-value is used as a measure of the size of the molecule of the products of the invention and obtained by the method of H. Fikentscher, "Cellulosechemie," 13 (1932), p. 58. In Examples 2, 5, 7 and 8 peroxide initiators were also added to the reaction mixture in the amounts given in the final column 7 of Table 1. Here, the capital letter A represents butylhydroperoxide; the capital letter B represents 1,3 bis-(tert-butylperoxyisopropyl)benzene, and the capital letter C represents tert-butylamylperoxide.

(4) After conclusion of the hydrolysis dealt with under point 3, it results an end product characterised in greater detail in columns 8, 9, 10 of Table I. This is in most cases a clear viscous aqueous solution with a solids content of 18.9 (Example 7) to 22.9 (Example 10) percent by weight. The solids content is a measure of the degree of hydrolysis. Since the incorporation of 1 mol water per nitrile group results in the formation of one carboxylic acid amide group while the incorporation of 2 mol water per nitrile group results in the formation of an ammonium carboxylate group, low solids contents mean an incomplete hydrolysis which shows itself both in a residual amount of unreacted nitrile groups and in an only slight formation of ammonium carboxylate groups according to the present description. According to Table III, showing the dependence of the concentration of solid substance of polyacrylonitrile hydrolysate (solved in water) in percent by weight from the amount of the incorporation of mol of water in one unit (mol) of polyacrylonitrile, on incorporation of 1 mol of water in one unit of the polyacrylonitrile a 20.1% by weight aqueous solution is obtained and on incorporation of 2 mol water in one unit of the polyacrylonitrile a 25.2% by weight aqueous solution is obtained. Besides of the graph of Table III, the said dependence is lined up in the column No. 12 of Table I. A further discussion of this follows in the evaluation of the tabular data appended to Tables I, II and III.

(5) The values given in column 11 of Table I for the relative viscosity of the aqueous solution of the product of the invention were obtained by means of an Ubbelohde viscosimeter by comparing the velocities of flow of the solutions. A 2-normal sodium nitrate solution was used for comparison and as test solution a 2-normal sodium nitrate solution containing 1% by weight (calculated on the dry substance) of each was used in turn of the polyacrylonitrile hydrolysates to be tested.

(6) An important way of determining the stability of drilling fluids is the investigation of their filterability in accordance with "API-Code 29," by which the filtration values given in Table II, columns 12, 13, 14 and 15 were obtained. The water loss characterising the quality of the fluid in this filtration test refers to the amount of water which flows through a standardised filter press in a time of 30 min. at a prescribed pressure of 7 kg./cm.². The smaller this amount the better the stability of the fluid. The test is carried out at room temperature. The samples were first heated for 24 hours at 20° C. (Table II, columns 12 and 14) and 24 hours at 200° C. (Table II, lines 13 and 15) in a rotating autoclave. Two different drilling fluids were used, the compositions of which are given below, namely fluid No. 1 (Table II, columns 12 and 13) and fluid No. 2 (Table II, columns 14 and 15).

Drilling fluid 1 was composed of:

940 g. of a solution of 6% by weight attapulgite (suspension) in a saturated sodium chloride solution;
60 g. polyacrylonitrile hydrolysate (corresponding to the particular hydrolysate of each of the Examples 1–10);
15 g. nitric acid;
20 g. iron-chromium-lignosulphonate (commercial product "Spersene" of the firm Magcobar, Celle);
10 g. heavy-metal salt of humic acid (commercial product "XP 20"; "Huminat" of the firm Magcobar, Celle);
50 ml. asphalt in colloidal suspension (commercial product "Protectomagic" of firm Oil Base, Hamburg); and
10 g. emulsifier (commercial product "white magic" of the firm Oil Base, Hamburg).

Drilling fluid 2 had the following compositions:

30 g. of an attapulgite product (SWDC; commercial product "Waloran"® of the firm Wolff Walsrode AG, Walsrode);
5 g. Walsroder active bentonite (commercial product of the firm Wolff Walsrode AG, Walsrode);
20 g. polyacrylonitrile hydrolysate (corresponding to the particular hydrolysate of each of the Examples 1–10);
3 g. nitric acid;
50 g. sodium chloride; and
297 g. water.

(7) The resistance to calcium and magnesium ions of the drilling fluids containing polyacrylonitrile hydrolysate given in column 16 of Table II was obtained in the following way:

10 g. of a commercial polyacrylonitrile hydrolysate and 10 g. of the polyacrylonitrile hydrolysate of the invention in separate flasks were in each case diluted with 50 ml. of slightly warmed water. If 5 ml. of a saturated calcium chloride solution is added to the solution containing the commercial polyacrylonitrile hydrolysate a precipitate appears which rapidly settles.

A corresponding addition to the aforesaid solution containing the polyacrylonitrile hydrolysate of the invention causes no precipitate even if altogether four times as much calcium chloride solution is added.

TABLE I.—PREPARATION AND PROPERTIES OF THE POLYACRYLONITRILE HYDROLYSATES

| | | | | | | | | | | | |
|---|---|---|---|---|---|---|---|---|---|---|---|
| 1 | 2 | (3) | 4 | (5) | 6 | 7 | (8) | (9) | 10 | 11 | 12 |
| | | Starting material | | Hydrolysis | | | End product | | Solids in in wt. percent of aq. solution | Analysis, relative viscosity | Addition of H₂O moles per mol PAN |
| Example number | Type | Substance | Form | Time (h.) | Temperature (° C.) | Initiator added | Substance | Form | | | |
| 1 | I | PAN | Powder | 3 | 200 | | PAN-hydrolysate. | Aqueous solution. | 20.9 | 1.82 | 1.15 |
| 2 | I | PAN | do | 4 | 200 | 1 wt. percent A | do | do | 21.1 | 1.32 | 1.20 |
| 3 | I | PAN | do | 10 | 180 | | do | do | 20.5 | 2.07 | 1.08 |
| 4 | I | PAN | Fibre | 12 | 180 | | do | do | 20.7 | 2.04 | 1.12 |
| 5 | I | PAN | Powder | 7 | 180 | 1 wt. percent A | do | do | 21.0 | 1.80 | 1.18 |
| 6 | I | PAN | Fibre | {¹3, ¹3} | {190, 180} | | do | do | 21.9 | 1.89 | 1.35 |
| 7 | I | PAN | Powder | 8.5 | 180 | 0.5 wt. percent B | do | do | 18.9 | 1.99 | 0.78 |
| 8 | I | PAN | do | 8 | 180 | 1 wt. percent C | do | do | 21.1 | 1.90 | 1.20 |
| 9 | C | PAN | do | 4 | 200 | | do | do | 2.5 | 1.32 | 1.47 |
| 10 | C | PAN | do | 4 | 220 | | do | do | 22.9 | 1.33 | 1.55 |

¹ Total 6 hrs.

TABLE II.—PROPERTIES OF THE DEEP-BORE DRILLING FLUIDS CONTAINING POLYACRYLONITRILE HYDROLYSATE

| Column number | | | | | |
|---|---|---|---|---|---|
| 1 | 2 | 3 | 4 | 5 | 6 |
| | Filtration values | | | | |
| | Fluid No. 1 at— | | Fluid No. 2 at— | | Resistant to Ca++ and Mg++ ions |
| PAN hydrolysate of example: | 20° C./ 24 hr. | 200° C./ 24 hr. | 20° C./ 24 hr. | 200° C./ 24 hr. | |
| 1 | 3.6 | 2.4 | 2.9 | 2.5 | Yes. |
| 2 | 29.0 | | | | No. |
| 3 | 1.2 | 1.0 | 2.7 | 2.5 | Yes. |
| 4 | 1.7 | 3.7 | (1) | (1) | Yes. |
| 5 | 1.8 | 7.5 | 3.0 | 8.1 | Yes. |
| 6 | 6.3 | | 5.4 + | 10.1 | Yes. |
| 7 | (1) | (1) | 2.5 | 2.6 | Yes. |
| 8 | (1) | (1) | 4.1 | 5.0 | Yes. |
| 9 | 38.0 | | (1) | (1) | No. |
| 10 | 72.0 | | (1) | (1) | No. |

[1] Not measured.

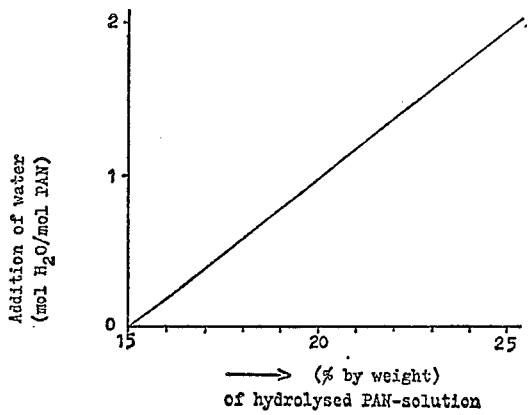

Addition of water (mol H₂O/mol PAN) vs. (% by weight) of hydrolysed PAN-solution From the above Tables I and II the following, among other things, can be seen:

A polymerisate according to the invention prepared as in Example 1 shows that it is, in the limit, possible to carry out the hydrolysis at temperatures of 200° C. if the reaction is discontinued after 3 hours, by which means a product of the composition of the invention is obtained having a solids content of 20.9 and hence an average incorporation of 1.2 mol water in one unit of the polyacrylonitrile. According to Table II, such a product has excellent filtration values and in this and the other examples of the invention it is surprising that the filtration values in the case of proceeding heat treatment of the product at 200° C. are better than with temperatures of only 20° C. This remarkable fact is to be observed both on using the product of the invention in the fluid composition 1 as well as in the composition 2.

If the corresponding values of Examples 1 and 2 are compared, it is seen that, with the same starting materials, the addition of a reaction accelerator while at the same time increasing the duration of the experiment by one hour to four hours resulted in a hydrolysed product that no longer showed the structure of the invention. Although in accordance with the relatively low solids content of 21.1% by weight the uptake of water compared with Example 1 had only slightly increased, the relatively low viscosity of 1.32 should indicate a hydrolysed product preferentially equipped with ammonium carboxylate groups which, according to Table II, has not only had a negative effect on the filtration value, which is very bad even at 20° C., but has also destroyed the resistance to calcium and magnesium ions.

If on the other hand, as in Examples 3 and 4, the reaction temperatures are maintained at 180° C. instead of 200° C. and if instead a reaction time 3–4 times as long is accepted, products in accordance with the invention are obtained having a low solids content and high relative viscosity, as a result of which, according to Example 2, excellent filtration values and very good resistance to calcium and magnesium ions is achieved.

In order to reduce the undesirably long reaction time, as in Example 5, 1% by weight of an initiator (butylhydroperoxide) can be added to the reaction components as a reaction accelerator while maintaining the milder reaction temperature of 180° C. in order to produce similarly good products of the invention compared with Examples 3 and 4. The somewhat higher filtration values compared with Examples 3 and 4, in the case of fluids 1 and 2, however indicate that an optimum compromise with regard to the experiment 1 conditions (temperature/reaction/time/reaction accelerator) has here been reached.

This is seen also on comparing Examples 4 and 6. With the same starting materials, the hydrolysis reaction was carried out in both cases without accelerator additives but in the first case (Example 4) the reaction proceeded for 12 hours at a temperature of only 180° C., while in the second case (Example 6) after 3 hours of mild reaction at 180° C. the temperature was raised to 190° C. and maintained for another 3 hours. The finished product showed a higher solids content and a lower relative viscosity, which indicates an undesirably increased hydrolysis with a correspondingly reduction of unreacted nitrile groups. Proof of this assumption is provided by the poor filtration value of fluid 1 which, even at 20° C., amounted to 6.3. In the case of fluid 2 also the filtration values were noticeably increased but were still within tolerable limits. The resistance achieved to calcium and magnesium ions shows that the increased hydrolysis has not led to too great an increase in the number of ammonium carboxylate groups, which in fact are chiefly responsible for instability in the presence of the said calcium and magnesium ions, but that at most the buffering effect of the unreacted nitrile groups has been diminished owing to the very pronounced reduction in their numbers during the hydrolysis.

Examples 7 and 8 of the invention give, finally, an indication of the successful use of other reaction accelerators (B and C) with the aid of which it was possible, while maintaining a mild temperature of 180° C. during the hydrolysis, to reduce the duration of the reaction from 10–12 hours to 8–8.5 hours, without adversely affecting the excellent quality of the products of the invention. This can be seen from the solids content and the relative viscosity in Table I, as well as from the favourable values of fluid 2 in Table II and, finally, from the high resistance to calcium and magnesium ions.

If, as in Examples 9 and 10, the same starting material is treated, in order to hydrolyse it, in the way described in the German patent specification No. 1,207,086, column 3, lines 32–51 (Example 9) or column 4, lines 51–63 (Example 10), products are obtained which have compared with the products of the invention both a considerably increased solids content (22.5 and 22.9) and a very low relative viscosity (1.32 and 1.33).

The filtration values are correspondingly unfavourable which, on account of the high filtration speeds, were only measured in the case of drilling fluid No. 1 for the pretreatment temperatures of 20° C. and 200° C. (under the same condition as corresponding drilling fluids with the polyacrylonitrile hydrolysates of the invention). While maintaining the same experimental conditions, the resistance to calcium and magnesium ions was also measured for the said comparison products and for the drilling fluids containing them. The results were negative in both cases.

Thus the considerable superiority of the newly discovered polyacrylonitrile hydrolysates of the invention compared with the previously known polyacrylonitrile hydrolysates is plain.

Confirmation that the reason for this superiority of the polyacrylonitrile hydrolysates of the invention is the presence of unreacted nitrile groups is confirmed by the results presented in the following Table IV of a comparative investigation of the infra-red spectro of 2 different polyacrylonitrile hydrolysates. The 3 extinction bands of interest here, for (a) the nitrile group, (b) the carboxylic acid amide group and (c) the ammonium carboxylate group are compared with each other, with I signifying a commercial product of German patent specification 1,207,086 and II referring to the product of the invention. Now, while the bands largely coincide for the carboxylic acid amide group and the ammonium carboxylate group, in the case of the two products, the band for the nitrile group of the product of the invention shows a clear extinction which is absent in the case of the commercial product.

The invention can be applied to all acrylonitrile polymerisates having 1–25% by weight residual nitrile groups the hydrolysis products of which are water soluble. The use of such products of the invention is not limited to the two drilling solutions 1 and 2 given in the above Table but extends to all applications for which the products of the invention can be employed. Thus, for example, the drilling solutions may contain, besides the product of the invention (polyacrylonitrile hydrolysate) asbestos as a carrier, completely or partly replacing the attapulgite component of the drilling fluid so that a drilling fluid having optimum performance and stability is obtained.

In this connection, a special asbestos product of type AA 1 (commercially available from the firm Wolff Walsrode AG) by itself or mixed with the above mentioned attapulgite mixture "Waloran"® (commercially available from Wolff Walsrode AG), where "'Waloran" is mainly used for drilling fluids at small to medium depths, while asbestos AA 1 is mainly for use in deep-bore drilling fluids, in each case in combination with the polyacrylonitrile hydrolysate of the invention.

The excellent performance and stability of a driling fluid containing both a polyacrylonitrile hydrolysate of the invention and the above-mentioned asbestos will now be illustrated by the following example without being limited to this.

340 g. of a polyacrylonitrile fiber (Dralon®) was hydrolysed for 8 hours at 180° C. with 2100 ml. water and 0.5% by weight, calculated on the weight of polyacrylonitrile, of butylhydroperoxide. The end product present in aqueous solution had a solids content of 20.5% by weight and a relative viscosity of 1.95.

This end product was then used for the preparation of two drilling fluid solutions where one solution had the composition as follows:

30 g. of an attapulgite mixture corresponding to the commercial product "Waloran"® of Wolff Walsrode AG, Walsrode;
5 g. WALSRODER active bentonite (commercial product of Wolff Walsrode AG, Walsrode);
20 g. polyacrylonitrile hydrolysate according to the invention;
3 g. nitric acid;
50 g. sodium chloride; and
297 g. water, while to the other drilling fluid, here called Drilling Fluid III, instead of the 30 g. "Waloran"®, 30 g. asbestos AA 1 (commercial product of Wolff Walsrode AG) was added.

The stability of these two drilling fluids was now tested by measuring their filterability in accordance with "API-Code 29" with the following results:

Fluid II (without asbestos) at 20° C./24 hrs.: 2.2 ml.
Fluid III (with asbestos) at 20° C./24 hrs.: 3.2 ml.
Fluid II (without asbestos) at 200° C./24 hrs.: 4.2 ml.
Fluid III (with asbestos) at 200° C./24 hrs.: 3.1 ml.
Fluid II (without asbestos) at 200° C./67 hrs.: 5.2 ml.
Fluid III (with asbestos) at 200° C./67 hrs.: 3.2 ml.

From this it is seen that at 200° C. the already very good filtration values obtained by the addition of the polyacrylonitrile hydrolysate of the invention to drilling fluids II and III are still further improved by the replacement of attapulgite with asbestos as shown above which causes a further reduction in the water loss shown by the filtration values. These excellent drilling fluids also possess very good resistance to calcium and magnesium ions.

The use in accordance with the invention of the new polyacrylonitrile hydrolysates is not limited to the combination with asbestos AA 1 and/or attapulgite in the field of high-temperature resistant deep-bore drilling fluids. However, by combining the polyacrylonitrile hydrolysate of the invention with the said special asbestos a very high TABLE IV
Infra-red spectra of the polyacrylonitrile hydrolysates I = product of German Patent 1 207 086

II = product of the invention

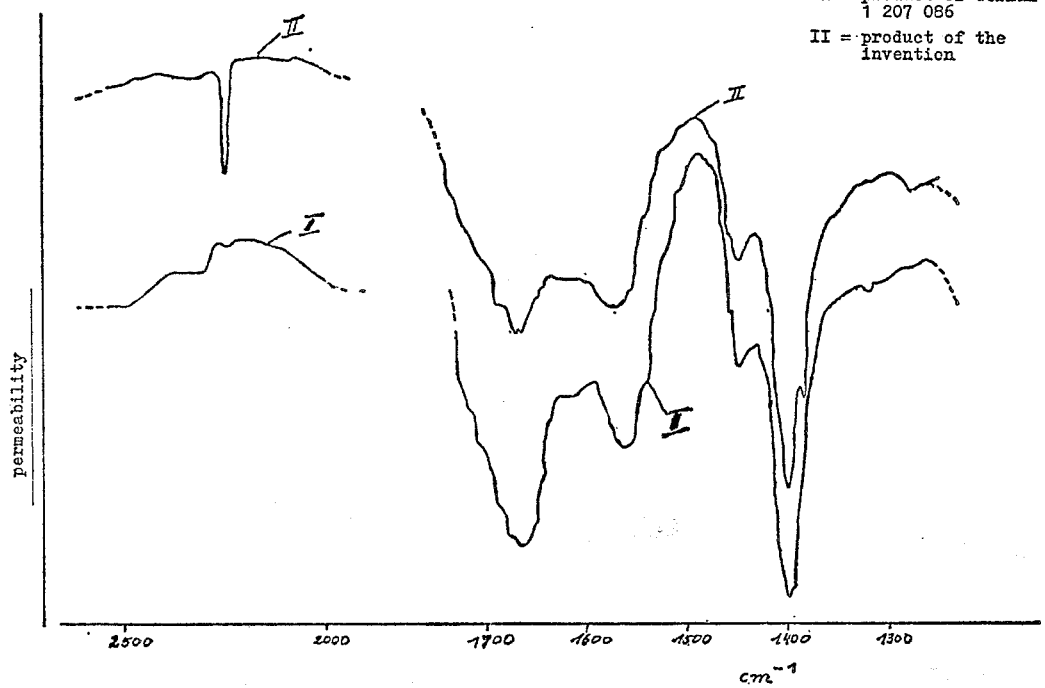

degree of durability is achieved and the economy of the invention results from, among other things, the possibility of a simple method of preparing the polyacrylontrile hydrolysate of the invention.

What we claim is:

1. The water soluble hydrolysis product of a polymer containing at least 95 percent by weight of polymerized acrylonitrile, said polymerized acrylonitrile portion of said hydrolysis product consisting essentially of 5–15 mole percent of non-hydrolyzed nitrile groups and 85–95 mole percent of hydrolyzed nitrile groups; in which 51–90 mole percent of said hydrolyzed nitrile groups are acid amide groups and 10–49 mole percent of said hydrolyzed nitrile groups are water soluble ammonium carboxylate groups.

2. The water soluble hydrolysis product of claim 1 comprising the hydrolysis product of polyacrylonitrile homopolymer.

3. The water soluble hydrolysis product of claim 1 comprising the hydrolysis product of a copolymer of acrylonitrile and up to 5% by weight of methyl acrylate.

4. The water soluble hydrolysis product of claim 1 having a relative viscosity of at least 1.80 at 1% by weight concentration in 2-normal sodium nitrate when compared to 2-normal sodium nitrate in an Ubbelohde viscometer.

5. The water soluble hydrolysis product of claim 1 capable of tolerating at least 5 ml. of saturated calcium chloride solution without precipitation when said calcium chloride is added to 10 g. of the hydrolysis product in 50 ml. of water.

6. The water soluble hydrolysis product of claim 5 capable of tolerating at least 20 ml. of saturated calcium chloride solution without precipitation.

7. The water soluble hydrolysis product of claim 1 in which the weight of the hydrolysis product is 26% to 46% greater than the weight of said polyacrylonitrile polymer.

References Cited

UNITED STATES PATENTS

| | | | |
|---|---|---|---|
| 2,812,314 | 11/1957 | Basdekis | 260—88.7 B |
| 3,200,102 | 8/1965 | Kleiner | 260—85.5 S |
| 3,022,279 | 2/1962 | Proffitt | 260—85.5 S |
| 3,029,228 | 4/1962 | Glavis | 260—85.5 S |

HARRY WONG, Jr., Primary Examiner

U.S. Cl. X.R.

260—29.6 R, 41 B, 80.3 N, 88.7 B

UNITED STATES PATENT OFFICE
CERTIFICATE OF CORRECTION

Patent No. 3,758,449    Dated September 11, 1973

Inventor(s) Lutz Hoppe, et al

It is certified that error appears in the above-identified patent and that said Letters Patent are hereby corrected as shown below:

Column 3, line 69, "5-35" should read ---10-49---.

Column 6, Table I, Column 10, "2..5" should read ---22.5---.

Column 6, Table I, Column 11, "2.07" should read ---2.08---.

Column 7, Table II, Column 4, "5.4+" should read ---5.4---.

Column 11, Claim 2, line 17, "homopolymer" should be deleted.

Signed and sealed this 7th day of January 1975.

(SEAL)
Attest:

McCOY M. GIBSON JR.
Attesting Officer

C. MARSHALL DANN
Commissioner of Patents